US011245106B2

(12) United States Patent
Ha et al.

(10) Patent No.: US 11,245,106 B2
(45) Date of Patent: Feb. 8, 2022

(54) ELECTRODE ASSEMBLY AND RECHARGEABLE BATTERY INCLUDING SAME

(71) Applicant: Samsung SDI Co., Ltd., Yongin-si (KR)

(72) Inventors: Jaehwan Ha, Yongin-si (KR); Kijun Kim, Yongin-si (KR); Junghyun Nam, Yongin-si (KR); Hoon Seok, Yongin-si (KR); Heeeun Yoo, Yongin-si (KR); Yeonhee Yoon, Yongin-si (KR); Kyuseo Lee, Yongin-si (KR); Bokkyu Jeon, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 284 days.

(21) Appl. No.: 16/376,959

(22) Filed: Apr. 5, 2019

(65) Prior Publication Data

US 2019/0319229 A1    Oct. 17, 2019

(30) Foreign Application Priority Data

Apr. 12, 2018  (KR) .................. 10-2018-0042847
Jan. 11, 2019   (KR) .................. 10-2019-0003970

(51) Int. Cl.
*H01M 4/131*       (2010.01)
*H01M 10/0585*    (2010.01)
(Continued)

(52) U.S. Cl.
CPC ......... *H01M 4/131* (2013.01); *H01M 4/1391* (2013.01); *H01M 4/366* (2013.01);
(Continued)

(58) Field of Classification Search
CPC ..................................................... H01M 4/366
See application file for complete search history.

(56) References Cited

U.S. PATENT DOCUMENTS

2006/0099495 A1* 5/2006 Suzuki ................. H01M 4/505
                                                                             429/128
2007/0026312 A1   2/2007 Imachi et al.
(Continued)

FOREIGN PATENT DOCUMENTS

EP          1619733 A1      1/2006
JP      2016-178070     *  10/2016
(Continued)

OTHER PUBLICATIONS

EPO Extended Search Report dated Aug. 14, 2019, for corresponding European Patent Application No. 19168694.8 (9 pages).
European Office action for Application No. 19 168 694.8, dated Oct. 18, 2021, 7 pages.

*Primary Examiner* — Jonathan Crepeau
(74) *Attorney, Agent, or Firm* — Lewis Roca Rothgerber Christie LLP (57) ABSTRACT

An electrode assembly and a rechargeable battery including the same are disclosed. The electrode assembly includes a plurality of unit cells overlapping in a thickness direction of the plurality of unit cells and a functional unit cell disposed with the plurality of unit cells. The functional unit cell includes a positive electrode. The positive electrode includes a positive current collector, a positive active material layer on at least one surface of the positive current collector and including a positive active material having a first reference potential, and a functional layer on the positive active material layer and including an active material having a lower reference potential than the first reference potential.

20 Claims, 5 Drawing Sheets

(51) Int. Cl.

| | |
|---|---|
| *H01M 10/0587* | (2010.01) |
| *H01M 4/1391* | (2010.01) |
| *H01M 4/36* | (2006.01) |
| *H01M 4/525* | (2010.01) |
| *H01M 4/58* | (2010.01) |
| *H01M 4/133* | (2010.01) |
| *H01M 4/02* | (2006.01) |

(52) U.S. Cl.
CPC ......... *H01M 4/525* (2013.01); *H01M 4/5825* (2013.01); *H01M 10/0585* (2013.01); *H01M 10/0587* (2013.01); *H01M 4/133* (2013.01); *H01M 2004/028* (2013.01); *H01M 2220/30* (2013.01)

(56) References Cited

U.S. PATENT DOCUMENTS

2014/0363736 A1    12/2014  Kim et al.
2017/0141385 A1     5/2017  Scordilis-Kelley et al.
2018/0316048 A1*   11/2018  Hasegawa ............ H01M 4/624

FOREIGN PATENT DOCUMENTS

| KR | 10-2007-0015039 A | 2/2007 |
| KR | 10-2013-0139796 A | 12/2013 |
| KR | 10-2014-0138079 A | 12/2014 |
| WO | 2014/149766 A1 | 9/2014 |
| WO | WO 2017/077055 A1 | 5/2017 |

* cited by examiner

ELECTRODE ASSEMBLY AND RECHARGEABLE BATTERY INCLUDING SAME

CROSS-REFERENCE TO RELATED APPLICATIONS

This application claims priority to and the benefit of Korean Patent Application No. 10-2018-0042847, filed in the Korean Intellectual Property Office on Apr. 12, 2018, and Korean Patent Application No. 10-2019-0003970, filed in the Korean Intellectual Property Office on Jan. 11, 2019, the entire contents of both of which are incorporated herein by reference.

BACKGROUND

1. Field

The present disclosure relates to an electrode assembly and a rechargeable battery including the same.

2. Description of the Related Art

A portable information device (such as a cell phone, a laptop, smartphone, and/or the like) and/or an electric vehicle has used a rechargeable lithium battery having high energy density and easy portability as a driving power source.

Particularly, research on use of a rechargeable lithium battery as a power source (for a hybrid and/or electric vehicle) and/or a power storage by using high energy density characteristics has recently been actively made.

One of the main research tasks (on the rechargeable lithium battery's being applied to a vehicle and/or the like) concerns high capacity. For example, a method of increasing a thickness and/or a size thereof has been suggested to realize high capacity of the rechargeable lithium battery.

However, when the rechargeable lithium battery becomes thicker and has a larger size in this way, the safety of the rechargeable lithium battery may be greatly deteriorated due to a heat dissipation difference inside/outside of the battery.

Accordingly, there is a need for further research on development of technology capable of improving the safety of the rechargeable lithium battery and, simultaneously, securing high power and/or high energy density thereof.

SUMMARY

Aspects of embodiments of the present disclosure are directed toward an electrode assembly having improved safety while having excellent cycle-life and capacity characteristics and a rechargeable battery including the same.

In an embodiment, the present disclosure provides an electrode assembly including a plurality of unit cells overlapping in a thickness direction of the plurality of unit cells; a first functional unit cell disposed on an outermost first surface of the plurality of unit cells; and a second functional unit cell on an outermost second surface that is opposite to the first surface, wherein each of the first functional unit cell and the second functional unit cell include an outer unit cell including a negative electrode, a positive electrode, and a separator disposed between the negative electrode and the positive electrode, and wherein the positive electrode includes a positive current collector, a positive active material layer disposed on at least one surface of the positive current collector and including a positive active material having a first reference potential, and a first functional layer disposed on the positive active material layer and including a first active material having a lower second reference potential than the first reference potential (having the second reference potential that is lower than the first reference potential).

In an embodiment, the present disclosure provides an electrode assembly including a plurality of unit cells overlapping in a thickness direction of the plurality of unit cells; and a third functional unit cell disposed at the center (e.g., in the center) in the thickness direction of the plurality of unit cells, wherein the third functional unit cell includes a central unit cell including a negative electrode, a positive electrode, and a separator disposed between the negative electrode and the positive electrode, and the positive electrode includes a positive current collector, a positive active material layer disposed on at least one surface of the positive current collector and including a positive active material having a first reference potential, and a second functional layer disposed on the positive active material layer and including a second active material having a lower third reference potential than the first reference potential (having the third reference potential that is lower than the first reference potential).

In an embodiment, the present disclosure provides a rechargeable battery including the electrode assembly.

When the electrode assembly according to an embodiment is applied, a rechargeable battery having improved safety as well as excellent cycle-life characteristics and capacity characteristics may be realized.

DETAILED DESCRIPTION

Hereinafter, various embodiments of the present invention will be described in more detail with reference to the accompanying drawings so that those skilled in the art may easily carry out the present invention. However, this disclosure may be embodied in many different forms and should not be construed as limited to the example embodiments set forth herein.

In order to clearly illustrate the present invention, parts that are not related to the description are omitted, and the same or similar components are denoted by like reference numerals throughout the specification.

Sizes and thicknesses of components in the drawings are arbitrarily expressed for convenience of description and, thus, the present invention is not limited by the drawings.

In addition, unless explicitly described to the contrary, the word "comprise," and variations such as "comprises" or "comprising," will be understood to imply the inclusion of stated elements but not the exclusion of any other elements.

In one aspect of the present disclosure, an electrode assembly having improved safety as well as excellent cycle-life characteristics and capacity characteristics is provided.

Hereinafter, the reference potential of a positive active material refers to a discharge average potential based on lithium metal as a reference (Li/Li$^+$). Also, the unit cell is an electrode assembly in which a positive electrode, a separator, and a negative electrode are sequentially stacked.

Figure 1A:
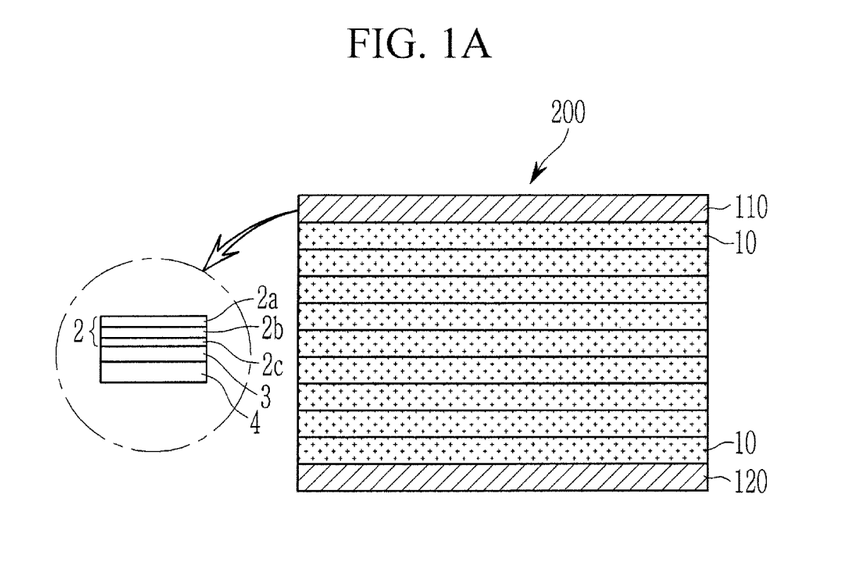
FIG. 1A schematically illustrates a structure of an electrode assembly according to an embodiment of the present disclosure.

FIG. 1A schematically illustrates a structure of an electrode assembly according to an embodiment of the present disclosure.

Referring to FIG. 1A, the electrode assembly 200 includes a plurality of unit cells 10, a first functional unit cell 110, and a second functional unit cell 120.

The term "functional unit cell" may refer to a unit cell dedicated to perform a function of preventing heat generation. The term "functional layer" may refer to a layer dedicated to perform the function above as well.

The plurality of unit cells 10 are overlapped in the thickness direction of the plurality of unit cells 10. FIG. 1A shows a specific number of unit cells 10 stacked for convenience, but the number of stacked unit cells 10 may be appropriately (suitably) adjusted as needed.

As shown in FIG. 1A, the first functional unit cell 110 and the second functional unit cell 120 may be disposed at outermost portions (locations) of the electrode assembly 200, and each of the first functional unit cell 110 and the second functional unit cell 120 will be referred to as an outer unit cell in the following description.

The outer unit cell includes a negative electrode 4, a positive electrode 2, and a separator 3 interposed between the negative electrode 4 and the positive electrode 2, as shown in an enlarged manner in FIG. 1A.

Figure 1B:
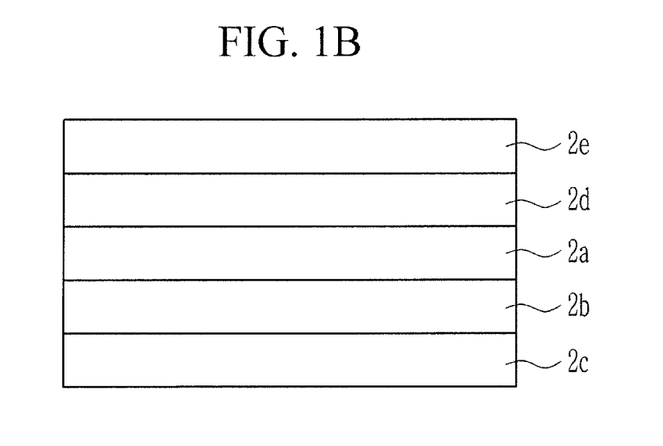
FIG. 1B schematically illustrates a positive electrode according to an embodiment of the present disclosure.

The positive electrode 2 includes a positive current collector 2a and a positive active material layer 2b disposed on (under) at least one surface of the positive current collector 2a and including a positive active material, and a first functional layer 2c disposed on (under) the positive active material layer 2b and including a first active material. FIG. 1A shows only a structure of the positive electrode 2 having a positive active material layer disposed on one surface of a current collector, but the positive active material may be disposed on both (opposite) surfaces of the current collector, and, further, the structure of FIG. 1A shows that the first functional layer 2c is disposed on one surface of the positive active material layer 2b and contacts the separator 3, but, as shown in FIG. 1B, in an embodiment, when the positive active material layer 2b and another positive active material layer 2d, are disposed on both (opposite) surfaces of the current collector 2a, the first functional layer 2c and another first functional layer 2e may be respectively disposed on the positive active material layer 2b and the positive active material layer 2d.

In an embodiment, the positive active material included in the positive active material layer has a first reference potential, and a first active material included in the first functional layer has a lower second reference potential than the first reference potential of the positive active material (has the second reference potential that is lower than the first reference potential).

The first reference potential may be, for example, in the range of about 3.3 V to about 4.3 V, about 3.5 V to about 4.0 V, or about 3.6V to about 3.8V.

As used herein, the first reference potential, which is the reference potential of the positive active material, is a reduction average potential based on a lithium metal (Li/Li$^+$).

On the other hand, the positive active material may include a compound (lithiated intercalation compound) capable of intercalating and deintercallating lithium. The positive active material may be, for example, lithium and at least one composite oxide of a metal selected from cobalt, manganese, nickel, and a combination thereof. More specifically, it may include $Li_aA_{1-b}X_bD_2$ (0.90≤a≤1.8, 0≤b≤0.5); $Li_aA_{1-b}X_bO_{2-c}D_c$ (0.90≤a≤1.8, 0≤b≤0.5, 0≤c≤0.05); $Li_aE_{1-b}X_bO_{2-c}D_c$ (0.90≤a≤1.8, 0≤b≤0.5, 0≤c≤0.05); $Li_aE_{2-b}X_bO_{4-c}D_c$ (0.90≤a≤1.8, 0≤b≤0.5, 0≤c≤0.05); $Li_aNi_{1-b-c}Co_bX_cD_\alpha$ (0.90≤a≤1.8, 0≤b≤0.5, 0≤c≤0.5, 0<α≤2); $Li_aNi_{1-b-c}Co_bX_cO_{2-\alpha}T_\alpha$ (0.90≤a≤1.8, 0≤b≤0.5, 0≤c≤0.05, 0<α<2); $Li_aNi_{1-b-c}Co_bX_cO_{2-\alpha}T_2$ (0.90≤a≤1.8, 0≤b≤0.5, 0≤c≤0.05, 0<α<2); $Li_aNi_{1-b-c}Mn_bX_cD_\alpha$ (0.90≤a≤1.8, 0≤b≤0.5, 0≤c≤0.05, 0<α≤2); $Li_aNi_{1-b-c}Mn_bX_cO_{2-\alpha}T_\alpha$ (0.90≤a≤1.8, 0≤b≤0.5, 0≤c≤0.05, 0<α<2); $Li_aNi_{1-b-c}Mn_bX_cO_{2-\alpha}T_2$ (0.90≤a≤1.8, 0≤b≤0.5, 0≤c≤0.05, 0<α<2); $Li_aNi_bE_cG_dO_2$ (0.90≤a≤1.8, 0≤b≤0.90, 0≤c≤0.5, 0.001≤d≤0.1); $Li_aNi_bCo_cMn_dG_eO_2$ (0.90≤a≤1.8, 0≤b≤0.90, 0≤c≤0.5, 0≤d≤0.5, 0.001≤e≤0.1); $Li_aNiG_bO_2$ (0.90≤a≤1.8, 0.001≤b≤0.1); $Li_aCoG_bO_2$ (0.90≤a≤1.8, 0.001≤b≤0.1); $Li_aMn_{1-b}G_bO_2$ (0.90≤a≤1.8, 0.001≤b≤0.1); $Li_aMn_2G_bO_4$ (0.90≤a≤1.8, 0.001≤b≤0.1); $QO_2$; $QS_2$; $LiQS_2$; $V_2O_5$; $LiV_2O_5$; $LiZO_2$; $LiNiVO_4$; or a combination thereof.

In chemical formulae, A is selected from Ni, Co, Mn, and a combination thereof; X is selected from Al, Ni, Co, Mn, Cr, Fe, Mg, Sr, V, a rare earth element, and a combination thereof; D is selected from O, F, S, P, and a combination thereof; E is selected from Co, Mn, and a combination thereof; T is selected from F, S, P, and a combination thereof; G is selected from Al, Cr, Mn, Fe, Mg, La, Ce, Sr, V, and a combination thereof; Q is selected from Ti, Mo, Mn, and a combination thereof; and Z is selected from Cr, V, Fe, Sc, Y, and a combination thereof.

In the positive electrode, an amount of the positive active material may be about 90 wt % to about 99.8 wt % based on a total weight of the positive active material layer.

As needed, the positive active material layer may further include a binder and a conductive material. Herein, the binder and the conductive material may be included in an amount of about 0.1 wt % to about 5 wt % based on a total weight of the positive active material layer.

The binder improves binding properties of positive active material particles with one another and with a current collector. Examples of the binder may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material is included to provide electrode conductivity. Any electrically conductive material may be used as a conductive material unless it causes a chemical change. Examples of the conductive material may include a carbon-based material (such as natural graphite, artificial graphite, carbon black, acetylene black, ketjen black, a carbon fiber, and/or the like); a metal-based material of a metal powder or a metal fiber including copper, nickel, aluminum, silver, and the like; a conductive polymer such as a polyphenylene derivative; or a mixture thereof.

The first functional layer is disposed on the positive active material layer, and the first functional layer includes a first active material having a lower second reference potential than the first reference potential. For example, the second reference potential may be in a range of about 1.5 V to about 3.8 V, about 2.0V to about 3.6V, about 2.5V to about 3.5V, about 3.0 V to about 3.5 V, or about 3.1V to about 3.3V. When the second reference potential of the first active material satisfies the above-described numerical ranges and is lower than the first reference potential, a side reaction of the positive active material may be suppressed and safety may be secured.

As used herein, the second reference potential, which is the reference potential of the first active material, is a reduction average potential based on a lithium metal (Li/Li$^+$).

The first active material may be, for example, $Li_aFe_{1-g}G_gPO_4$ (0.90≤a≤1.8, 0≤g≤0.5); $Li_aMn_{1-g}G_gPO_4$ (0.90≤a≤1.8, 0≤g≤0.5); $Li_aCo_{1-g}G_gPO_4$ (0.90≤a≤1.8, 0≤g≤0.5); $Li_{4-x}M_xTi_yO_{12-z}$ (0≤x≤3, 1≤y≤5, −0.3≤z≤0.3), or a combination thereof. In the above chemical formulae, G is selected from Al, Cr, Mn, Fe, Mg, La, Ce, Sr, V, and a combination thereof; and M is selected from Mg, La, Tb, Gd, Ce, Pr, Nd, Sm, Ba, Sr, Ca, and a combination thereof.

The first active material may be an active material having a lower reference potential than the first reference potential, among the active materials. In other words, when the positive active material included in the positive active material layer is selected, an active material having a lower second reference potential than the first reference potential of the positive active material may be selected as the first active material.

In this way, when the first active material is selected to have a lower reference potential than that of the positive active material included in the active material layer, a side reaction of the positive electrode may be suppressed and safety of a positive electrode may be improved.

The first functional layer may further include a binder. When the first functional layer includes the binder, the first active material may be included in an amount of about 90 wt % to about 99.8 wt % based on a total weight of the first functional layer, and the binder may be included in an amount of about 0.2 wt % to about 10 wt % based on a total weight of the first functional layer. According to an embodiment, the binder may be included in an amount of about 1 wt % to about 6 wt %.

In addition, as shown in FIG. 1B, when the positive active material layers are disposed on both (opposite) surfaces of a current collector, and the first functional layers are respectively disposed on the positive active material layers, the positive active material layers on both (opposite) surfaces of the current collector are respectively called to be a first positive active material layer and a second positive active material layer, and the first functional layers are respectively called to be a 1a functional layer and a 1b functional layer, and, herein, positive active materials included in the first and second positive active material layers may be the same as or different from each other among the positive active materials having a first reference potential, and active materials included in the 1a and 1b functional layers also may be the same as or different from each other among the active materials having a second reference potential.

In the outer unit cell, a difference between the first reference potential and the second reference potential may be in the range of about 0.01 V to about 2.0 V, about 0.05 V to about 1.5 V, about 0.1 V to about 1.0 V about 0.1 V to about 0.6 V. When the difference in the reference potentials of the positive active material included in the positive active material layer and the first active material included in the first functional layer satisfies the range, excellent cycle-life characteristics and capacity characteristics may be exhibited.

The first functional layer may have a thickness of about 0.5 μm to about 8 μm and, according to an embodiment, a thickness of about 2 μm to about 5 μm. When the first functional layer has a thickness within these ranges, the first functional layer substantially covers the positive active material layer as well as maintains conductivity, and a formation effect of the first functional layer may be further appropriately obtained.

In this way, when the outer unit cell includes a positive electrode including the first functional layer disposed on the positive active material layer, wherein a first active material included in the first functional layer has a lower second reference potential than a first reference potential of the positive active material, a side reaction may be reduced by preventing (or protecting from) an overvoltage of the positive active material layer, and ignition may be prevented (or protected from) by disposing the first active material having a low reference potential on the surface, thereby lowering a heat value when a short circuit occurs internally, and thus securing safety.

The positive current collector may be, for example, selected from an aluminum foil, a nickel foil, and a combination thereof.

In an embodiment and referring to FIG. 1A, the negative electrode 4 includes a negative electrode collector and a negative active material layer disposed on at least one surface of the negative electrode collector. The negative active material layer includes a negative active material.

The negative active material may include a material that reversibly intercalates/deintercalates lithium ions, a lithium metal, a lithium metal alloy, a material being capable of doping/dedoping lithium, and/or a transition metal oxide.

The material that reversibly intercalates/deintercalates lithium ions may be a carbon material, that is, a suitably-used carbon-based negative active material in a rechargeable lithium battery. Examples of the carbon-based negative active material may be crystalline carbon, amorphous carbon, and a combination thereof. The crystalline carbon may be shapeless (unspecified shape), and/or sheet-, flake-, spherical-, and/or fiber-shaped natural graphite and/or artificial graphite. The amorphous carbon may be a soft carbon, a hard carbon, a mesophase pitch carbonization product, fired coke, and/or the like.

The lithium metal alloy includes an alloy of lithium and a metal selected from Na, K, Rb, Cs, Fr, Be, Mg, Ca, Sr, Si, Sb, Pb, In, Zn, Ba, Ra, Ge, Al, and Sn.

The material being capable of doping/dedoping lithium may be a silicon-based material, for example, Si, $SiO_x$ (0<x<2), an Si-Q alloy (wherein Q is an element selected from an alkali metal, an alkaline-earth metal, a Group 13 element, a Group 14 element, a Group 15 element, a Group 16 element, a transition metal, a rare earth element, and a combination thereof, and not Si), an Si-carbon composite, Sn, $SnO_2$, an Sn—R alloy (wherein R is an element selected from an alkali metal, an alkaline-earth metal, a Group 13 element, a Group 14 element, a Group 15 element, a Group 16 element, a transition metal, a rare earth element, and a combination thereof, and not Sn), an Sn-carbon composite, and/or the like. At least one of these materials may be mixed with $SiO_2$. The elements Q and R may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, and a combination thereof.

The transition metal oxide includes lithium titanium oxide.

In the negative active material layer, the negative active material may be included in an amount of about 95 wt % to about 99 wt % based on a total weight of the negative active material layer.

The negative active material layer includes a negative active material and a binder, and may further include a conductive material as needed.

In the negative active material layer, the negative active material may be included in an amount of about 95 wt % to about 99 wt % based on a total weight of the negative active material layer. In the negative active material layer, a content of the binder may be about 1 wt % to about 5 wt % based on a total weight of the negative active material layer. When the negative active material layer includes a conductive material, the negative active material layer includes about 90 wt % to about 99.4 wt % of the negative active material, about 0.5 wt % to about 5 wt % of the binder, and about 0.1 wt % to about 5 wt % of the conductive material.

The binder improves binding properties of negative active material particles with one another and with a current collector. The binder may be a non-water-soluble binder, a water-soluble binder, or a combination thereof.

The non-water-soluble binder may be polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The water-soluble binder may be a styrene-butadiene rubber, an acrylated styrene-butadiene rubber, polyvinyl alcohol, sodium polyacrylate, a copolymer of propylene and a C2 to C8 olefin, a copolymer of (meth)acrylic acid and (meth)acrylic acid alkyl ester, or a combination thereof.

When the water-soluble binder is used as a negative electrode binder, a cellulose-based compound may be further used to provide viscosity as a thickener. The cellulose-based compound includes carboxylmethyl cellulose, hydroxypropylmethyl cellulose, methyl cellulose, and/or one or more alkali metal salts thereof. The alkali metal(s) may be Na, K, and/or Li. The thickener may be included in an amount of about 0.1 parts by weight to about 3 parts by weight based on 100 parts by weight of the negative active material.

The conductive material is included to provide electrode conductivity. Any electrically conductive material may be used as a conductive material unless it causes a chemical change. Examples of the conductive material include a carbon-based material (such as natural graphite, artificial graphite, carbon black, acetylene black, ketjen black, denka black, a carbon fiber, and/or the like); a metal-based material of a metal powder and/or a metal fiber (including copper, nickel, aluminum, silver, and/or the like); a conductive polymer (such as a polyphenylene derivative); and a mixture thereof.

The negative electrode collector may be, for example, selected from a copper foil, a nickel foil, a stainless steel foil, a titanium foil, a nickel foam, a copper foam, a polymer substrate coated with a conductive metal, and a combination thereof.

Also, the separator may include any materials suitably used in the rechargeable lithium battery as long as separating a negative electrode from a positive electrode and providing a transporting passage for lithium ions. In other words, the separator may have a low resistance to ion transportation and an excellent impregnation for an electrolyte. The separator may be, for example, selected from a glass fiber, polyester, polyethylene, polypropylene, polytetrafluoroethylene, and a combination thereof. It may have a form of a non-woven fabric or a woven fabric. Alternatively, a separator including a coating layer using a composition including a ceramic component and/or a polymer material on the substrate in order to ensure heat resistance or mechanical strength may be used. Optionally, it may have a mono-layered or multi-layered structure.

Next, the plurality of unit cells 10 overlapping in a thickness direction is described.

Each unit cell 10 includes a negative electrode, a positive electrode, and a separator disposed between the negative electrode and the positive electrode.

Herein, the negative electrode and the separator are the same as those described in the negative electrode and separator of the above outer unit cell, and thus detailed descriptions thereof will not be provided in more detail.

The positive electrode includes a positive current collector and a positive active material layer disposed on at least one surface of the positive current collector and including a positive active material. Herein, detailed descriptions of the positive current collector and the positive active material layer are the same as those described in the positive electrode of the aforementioned outer unit cell, and thus detailed descriptions thereof will not be provided in more detail. That is, the positive electrode of each unit cell 10 has the same structure and features as the positive electrode of the aforementioned outer unit cell, except that it does not include the first functional layer.

Figure 2:
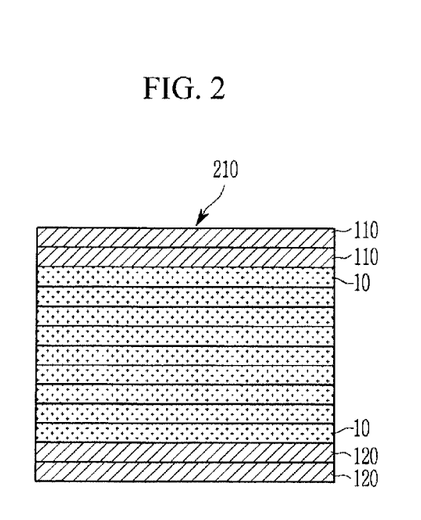
FIG. 2 illustrates an exemplary variation of FIG. 1B.

FIG. 2 illustrates an exemplary variation of FIG. 1A.

Referring to FIG. 2, the electrode assembly 210 according to the exemplary variation may include a plurality of first and second functional unit cells 110 and 120 disposed in the outermost locations of the electrode assembly 210, respectively.

For convenience, FIG. 2 illustrates that the electrode assembly 210 includes two first functional unit cells 110 and two second functional unit cells 120. However, if necessary, the number of the first and second functional unit cells 110 and 120 may be appropriately adjusted.

In this exemplary variation, other features are the same as the electrode assembly according to the first embodiment described above referring to FIG. 1A, except that the first and second functional unit cells 110 and 120 are respectively included in plural, and thus detailed descriptions thereof will not be provided in more detail.

Figure 3:
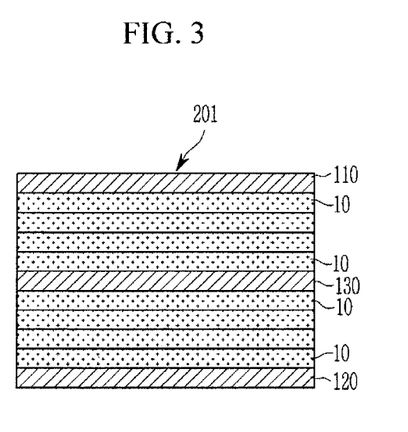
FIG. 3 schematically illustrates a structure of an electrode assembly according to an embodiment of the present disclosure.

FIG. 3 schematically illustrates a structure of an electrode assembly according to an embodiment of the present disclosure.

Referring to FIG. 3, the electrode assembly 201 according to the second embodiment includes a plurality of unit cells 10, a first functional unit cell 110, a second functional unit cell 120, and a third functional unit cell 130.

The third functional unit cell 130 is disposed at the center in the thickness direction of the plurality of unit cells 10, and is referred to as a central unit cell. Herein, the electrode assembly 201 may include at least one of the third functional unit cell 130.

The central unit cell includes a negative electrode, a positive electrode, and a separator disposed between the negative electrode and the positive electrode.

In the present embodiment, the positive electrode of the central unit cell includes a positive current collector and a positive active material layer disposed on at least one surface of the positive current collector and including a positive active material, and a second functional layer disposed on the positive active material layer.

The positive active material has a first reference potential, and the second active material included in the second functional layer has a lower third reference potential than the first reference potential of the positive active material (has the third reference potential that is lower than the first reference potential).

The first reference potential may be, for example, in the range of about 3.3 V to about 4.3 V, or about 3.5 V to about 4.0 V.

In the present embodiment, the positive current collector, the positive active material layer including the positive active material, and the negative electrode, and the separator are the same as described above in the electrode assembly according to the embodiment described above referring to FIG. 1A, and thus will not be described again in more detail.

The second functional layer is disposed on the positive active material layer, and the second functional layer includes a second active material having a third reference potential lower than the first reference potential.

The third reference potential may be, for example, in the range of about 1.5 V to about 3.8 V or about 3.0 V to about 3.5 V. When the third reference potential of the second active material satisfies the above-described numerical range and is lower than the first reference potential, a side reaction of the positive active material may be suppressed and safety may be secured.

As used herein, the third reference potential, which is a reference potential of the second active material, is a reduction average potential based on a lithium metal (Li/Li$^+$).

The second active material may be at least one among the active materials described above as the first active material. Like the first active material, the second active material has a lower reference potential than that of an active material included in the positive active material layer; that is, when a positive active material included in the positive active material layer is selected, an active material having a lower third reference potential than the first reference potential may be selected as a second active material.

In the central unit cell, a difference between the first reference potential and the third reference potential may be in the range of about 0.01 V to about 2.0 V. When the difference in the reference potentials of the positive active material included in the positive active material layer and the first active material included in the first functional layer satisfies the range, excellent cycle-life characteristics and capacity characteristics may be exhibited.

As shown in the embodiment, when a plurality of unit cells 10 includes the first and second functional unit cells 110 and 120 on first and second outermost surfaces facing oppositely away from each other and, further, a third functional unit cell 130 at the center in the thickness direction of the plurality of unit cells 10, not only may capacity be secured, but, also, heat generation may be more effectively reduced or prevented, when a physical impact such as penetration and the like is applied thereto.

FIG. 3 shows a case of including one third functional unit cell 130, for convenience. However, two or more third functional unit cells 130 may be included, if needed, which may be appropriately adjusted.

In another embodiment, other constitutions in this other embodiment except for further including the third functional unit cell 130 are the same or substantially the same as the electrode assembly of the embodiment illustrated referring to FIG. 1A.

Figure 4:
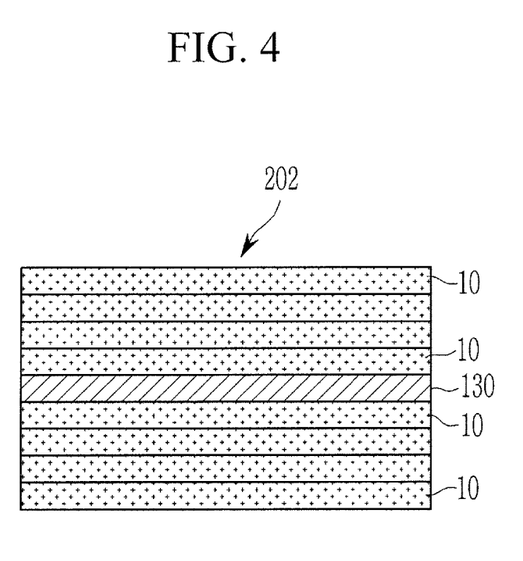
FIG. 4 schematically illustrates a structure of an electrode assembly according to an embodiment of the present disclosure.

FIG. 4 schematically illustrates a structure of an electrode assembly according to an embodiment of the present disclosure.

Referring to FIG. 4, the electrode assembly 202 includes a plurality of unit cells 10 and a third functional unit cell 130.

The third functional unit cell 130 is disposed at the center in the thickness direction of the plurality of unit cells 10, and is referred to as a central unit cell. Herein, the electrode assembly 202 may include at least one third functional unit cell 130.

The central unit cell includes a negative electrode, a positive electrode, and a separator disposed between the negative electrode and the positive electrode.

In the present embodiment, the positive electrode of the central unit cell includes a positive current collector, a positive active material layer disposed on at least one surface of the positive current collector and including a positive active material, and a second functional layer disposed on the positive active material layer.

The positive active material has a first reference potential, and the second active material included in the second functional layer has a lower third reference potential than the first reference potential of the positive active material.

The first reference potential may be, for example, in the range of about 3.3 V to about 4.3 V, or about 3.5 V to about 4.0 V.

In the present embodiment, the positive current collector, the positive active material layer including the positive active material, and the negative electrode, and the separator are the same as described above in the electrode assembly according to the first embodiment described above referring to FIG. 1A, and thus will not be described again in more detail.

The second functional layer is disposed on the positive active material layer, and the second functional layer includes a second active material having a third reference potential lower than the first reference potential.

Specific illustration of the second functional layer is the same as aforementioned in the electrode assembly of the embodiment illustrated referring to FIG. 3, and thus will not be provided in more detail.

As shown in the embodiment, when the central unit cell is disposed at the center of the plurality of unit cells 10 in the thickness direction and includes a positive electrode including a second functional layer on a positive active material layer, wherein a second active material included in the second functional layer has a lower third reference potential than a first reference potential of a positive active material, and when a physical impact, such as a penetration into a center of an electrode assembly and the like, is applied thereto, heat generation from the center may be reduced, and safety may be further improved.

FIG. 4 shows that the third functional unit cell 130 includes one central unit cell for convenience. However, the third functional unit cell 130 may include two or more central unit cells, which may be appropriately adjusted.

In the embodiment of FIG. 4, the same electrode assembly as illustrated in the embodiment referring to FIG. 1A is used, except for including not the first and second functional unit cells but instead including the third functional unit cell 130.

On the other hand, the present disclosure in another embodiment provides a rechargeable battery including an electrode assembly according to one of the above embodiments.

A rechargeable battery according to an embodiment includes an electrode assembly according to the above embodiments and modified embodiments thereof and a case housing the electrode assembly.

Specific illustration of the electrode assembly is the same as above and will be omitted here.

In the above electrode assemblies, the positive electrode, the negative electrode, and the separator included in each unit cell, outer unit cell, and central unit cell may be impregnated with an electrolyte.

The electrolyte includes a non-aqueous organic solvent and a lithium salt.

The non-aqueous organic solvent serves as a medium for transmitting ions taking part in the electrochemical reaction of a battery.

The non-aqueous organic solvent may include a carbonate-based, ester-based, ether-based, ketone-based, alcohol-based, and/or aprotic solvent. The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and/or the like. The ester-based solvent may include methyl acetate, ethyl acetate, n-propyl acetate, dimethylacetate, methylpropionate, ethylpropionate, γ-butyrolactone, decanolide, valerolactone, mevalonolactone, caprolactone, and the like. The ether-based solvent may include dibutyl ether, tetraglyme, diglyme, dimethoxyethane, 2-methyltetrahydrofuran, tetrahydrofuran, and the like. The ketone-based solvent may be cyclohexanone, and/or the like. The alcohol-based solvent may include ethanol, isopropyl alcohol, and/or the like. The aprotic solvent may include nitriles, such as R—CN (wherein R is a C2 to C20 linear, branched, or cyclic hydrocarbon group, or may include a double bond, an aromatic ring, or an ether bond) and/or the like; amides, such as dimethyl formamide and/or the like; dioxolanes, such as 1,3-dioxolane and/or the like; and/or sulfolanes and/or the like.

The non-aqueous organic solvent may be used alone or in a mixture. When the organic solvent is used in a mixture, the mixture ratio may be controlled in accordance with a desirable battery performance.

In addition, the carbonate-based solvent may include a mixture of a cyclic carbonate and a chain-type carbonate. In this case, when the cyclic carbonate and the chain-type carbonate may be mixed together in a volume ratio of 1:1 to 1:9, performance of an electrolyte may be enhanced.

The non-aqueous organic solvent of the present disclosure may further include an aromatic hydrocarbon-based organic solvent in addition to the carbonate-based solvent. Herein, the carbonate-based solvent and the aromatic hydrocarbon-based organic solvent may be mixed in a volume ratio of about 1:1 to about 30:1.

The aromatic hydrocarbon-based organic solvent may be an aromatic hydrocarbon-based compound of Chemical Formula 1.

Chemical Formula 1

In Chemical Formula 1, $R_1$ to $R_6$ are the same or different and are selected from hydrogen, a halogen, a C1 to C10 alkyl group, a haloalkyl group, and a combination thereof.

Specific examples of the aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The non-aqueous electrolyte may further include an additive of vinylene carbonate and/or an ethylene carbonate-based compound of Chemical Formula 2 in order to improve cycle-life of a battery.

Chemical Formula 2

In Chemical Formula 2, $R_7$ and $R_8$ are the same or different and are selected from hydrogen, a halogen, a cyano group (CN), a nitro group ($NO_2$), and a fluorinated C1 to C5 alkyl group, provided that at least one of $R_7$ and $R_8$ is selected from a halogen, a cyano group (CN), a nitro group ($NO_2$), and a fluorinated C1 to C5 alkyl group and $R_7$ and $R_8$ are not both (simultaneously) hydrogen.

Examples of the ethylene carbonate-based compound may be difluoroethylenecarbonate, chloroethylene carbonate, dichloroethylene carbonate, bromoethylene carbonate, dibromoethylene carbonate, nitroethylene carbonate, cyanoethylene carbonate, and fluoroethylene carbonate. The amount of the additive for improving cycle-life may be used within an appropriate range.

The lithium salt dissolved in an organic solvent supplies a battery with lithium ions, basically operates the rechargeable lithium battery, and improves transportation of the lithium ions between a positive electrode and a negative electrode. Examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein x and y are natural numbers; for example, an integer ranging from 1 to 20), LiCl, LiI, and $LiB(C_2O_4)_2$ (lithium bis(oxalato) borate: LiBOB). A concentration of the lithium salt may range from about 0.1 M to about 2.0 M. When the lithium salt is included at the above concentration range, an electrolyte may have excellent performance and lithium ion mobility due to desired (optimal) electrolyte conductivity and viscosity.

The case may be pouch type, prismatic type, or cylindrical, depending on the shape of the electrode assembly. Each case may be used without any limitations as suitably used in the related art, and a detailed description thereof will not be described in more detail.

Figure 5:
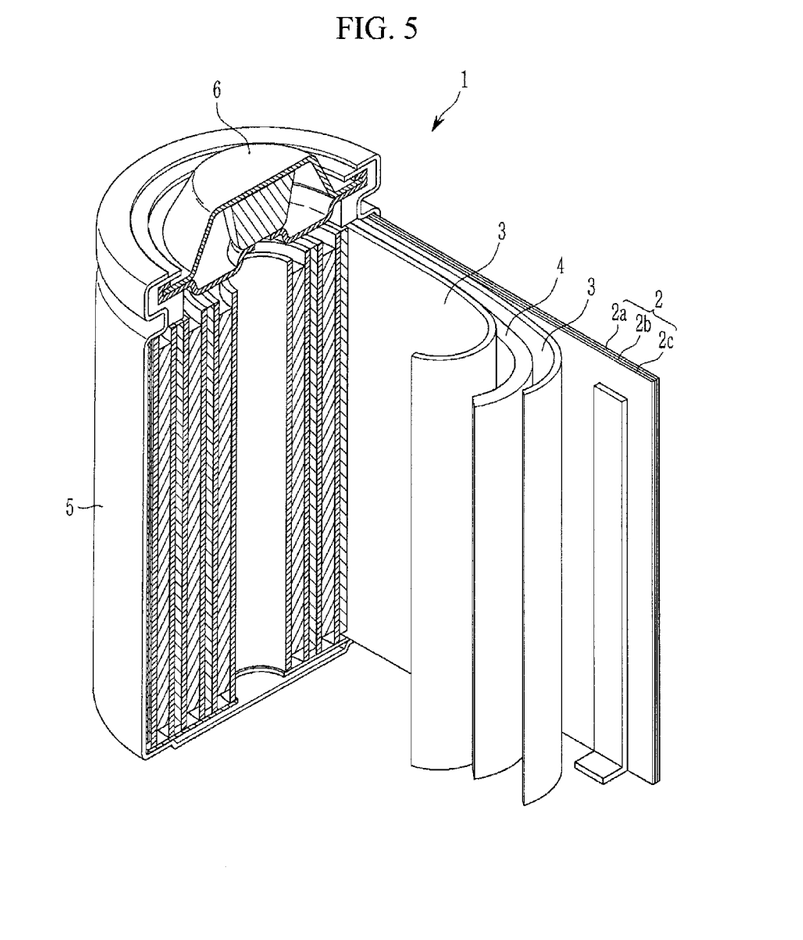
FIG. 5 schematically illustrates a structure of a cylindrical rechargeable battery according to an embodiment of the present disclosure.

The rechargeable battery according to an embodiment of the present invention maintains a shape of the electrode assembly, and may be of a stack type corresponding to a pouch type or may be of a winding type or a jelly-roll type in which the electrode assembly is wound, for example, cylindrical or prismatic. FIG. 5 schematically illustrates a structure (cross-section) of a cylindrical rechargeable battery according to an embodiment. The battery 1 includes a wound electrode assembly including a positive electrode 2 and a negative electrode 4 with a separator 3 interposed therebetween, a case 5 in which the electrode assembly is housed, and a sealing member 6 sealing the case 5. The positive electrode 2, the negative electrode 4, and the separator 3 may be impregnated with an electrolyte. FIG. 5 shows an embodiment in which the first functional layer $2c$ is disposed on the positive active material layer $2b$, which is disposed on one surface of the positive current collector $2a$ and includes a positive active material. However, as described above, the present disclosure is not limited thereto.

Also, at least one of the rechargeable battery according to an embodiment may be included in a device. Such a device may be, for example, one selected from a mobile phone, a tablet computer, a laptop computer, a power tool, a wearable electronic device, an electric vehicle, a hybrid electric vehicle, a plug-in hybrid electric vehicle, and a power storage device. In this way, the device to which the rechargeable battery is applied is known in a related art and thus will not be specifically illustrated in the present specification in more detail.

Hereinafter, the disclosure will be specifically examined through Examples.

Example 1

(1) Manufacture of Unit Cell 94 wt % of a $LiNi_{0.6}Co_{0.2}Mn_{0.2}O_2$ positive active material, 3 wt % of a polyvinylidene fluoride binder, and 3 wt % of a ketjen black conductive material were mixed in an N-methylpyrrolidone solvent to prepare positive active material slurry. The positive active material slurry was coated on both (opposite) surfaces of an aluminum current collector, and then dried and compressed to manufacture a positive electrode having a positive active material layer.

98 wt % of graphite, 0.8 wt % of carboxylmethyl cellulose, and 1.2 wt % of styrene-butadiene rubber were mixed in pure water (e.g., deionized water) to prepare negative active material slurry. The negative active material slurry was coated on both (opposite) surfaces of a copper current collector, and then dried and compressed to manufacture a negative electrode having a negative active material layer.

The negative electrode, a separator formed of a polyethylene and polypropylene multi-layered substrate, and the positive electrode in this order were sequentially stacked to manufacture a unit cell.

(2) Manufacture of Outer Unit Cell

Positive active material slurry was prepared by mixing 94 wt % of a positive active material having a composition of $LiNi_{0.6}Co_{0.2}Mn_{0.2}O_2$ and a reference potential of 3.67 V (a reduction average potential with reference to lithium metal ($Li/Li^+$)), 3 wt % of a polyvinylidene fluoride binder, and 3 wt % of a ketjen black conductive material in an N-methylpyrrolidone solvent.

A composition for a first functional layer was prepared by mixing 95 wt % of a first active material having a composition of $LiFePO_4$ and a reference potential of 3.15 V and 5 wt % of a polyvinylidene fluoride binder in an N-methylpyrrolidone solvent.

The positive active material slurry was coated on both (opposite) surfaces of an aluminum current collector, and then dried and compressed to form a positive active material layer, and the composition for a first functional layer was coated and then dried and compressed to form a first functional layer on the positive active material layer. Accordingly, a positive electrode having the first functional layer on the positive active material layer was manufactured.

A negative electrode was manufactured according to the same method as the above (1) (described above in (1)).

The negative electrode, a separator formed of a polyethylene and polypropylene multi-layered substrate, and the positive electrode manufactured in the above (2) in this order were sequentially stacked to manufacture an outer unit cell.

(3) Manufacture of Rechargeable Battery Cell

The thirteen (13) unit cells manufactured in the above (1) were overlapped in a thickness direction to manufacture a stack. The outer unit cells manufactured in the above (2) were respectively stacked on the outermost first and second surfaces of the stack to manufacture an electrode assembly having a structure shown in FIG. 1B and then housed in a case, and an electrolyte was injected thereinto to manufacture a rechargeable battery cell.

The electrolyte was prepared by dissolving 1.0 M $LiPF_6$ in a mixed solvent (50:50 volume ratio) of ethylene carbonate (EC) and diethyl carbonate (DEC).

Example 2

(1) Manufacture of Unit Cell

A unit cell was manufactured according to the same method as Example 1.

(2) Manufacture of Outer Unit Cell

An outer unit cell was manufactured according to the same method as Example 1.

(3) Manufacture of Central Unit Cell

Positive active material slurry was prepared by mixing 94 wt % of a positive active material having a composition of $LiNi_{0.6}Co_{0.2}Mn_{0.2}O_2$ and a reference discharge average potential of 3.67 V, 3 wt % of a polyvinylidene fluoride binder, and 3 wt % of a ketjen black conductive material in an N-methylpyrrolidone solvent.

95 wt % of a first active material having a composition of $LiFePO_4$ and a reference potential of 3.15 V and 5 wt % of a polyvinylidene fluoride binder were mixed in an N-methylpyrrolidone solvent to prepare a composition for a first functional layer.

The positive active material slurry was coated on both (opposite) surfaces of an aluminum current collector, and then dried and compressed to form a positive active material layer, and on the positive active material layer, the composition for a first functional layer was coated and then dried and compressed to form a first functional layer. Accordingly, a positive electrode having the first functional layer on the positive active material layer was manufactured.

A negative electrode was manufactured according to the same method as the above (1).

The negative electrode, a separator formed of a polyethylene and polypropylene multi-layered substrate, and the positive electrode manufactured in the above (2) were sequentially stacked to manufacture a central unit cell.

(4) Manufacture of Rechargeable Battery Cell

The thirteen (13) unit cells manufactured in the (1) of Example 2 were overlapped in a thickness direction of the unit cells to manufacture a stack of the unit cells. The outer unit cells manufactured in the (2) of Example 2 were respectively stacked on the outermost first and second surfaces of the stack manufactured in the (2), the central unit cell manufactured in the (3) of Example 2 was disposed at the center in the thickness direction of the stack to manufacture an electrode assembly having a structure shown in FIG. 3, the electrode assembly was housed in a case, and an electrolyte was injected thereinto to manufacture a rechargeable battery cell.

The electrolyte included 1.0 M $LiPF_6$ dissolved in a mixed solvent (a volume ratio of 50:50) of ethylene carbonate (EC) and diethyl carbonate (DEC).

Example 3

(1) Manufacture of Unit Cell

A unit cell was manufactured according to the same method as Example 1.

(2) Manufacture of Central Unit Cell

A central unit cell was manufactured according to the same method as Example 2.

(3) Manufacture of Rechargeable Battery Cell

The thirteen (13) unit cells manufactured in the above (1) of Example 3 were overlapped in a thickness direction to manufacture a stack. The central unit cell manufactured in the (2) of Example 3 was disposed at the center of the thickness direction of the stack manufactured in the (2) to manufacture an electrode assembly having a structure shown in FIG. 4 and housed in a case, and an electrolyte was injected thereinto to manufacture a rechargeable battery cell.

The electrolyte included 1.0 M $LiPF_6$ dissolved in a mixed solvent (a volume ratio of 50:50) of ethylene carbonate (EC) and diethyl carbonate (DEC).

Comparative Example 1

(1) Manufacture of Unit Cell

A unit cell was manufactured according to the same method as Example 1.

(2) Manufacture of Rechargeable Battery Cell

The thirteen (13) unit cells manufactured in the (1) were overlapped in a thickness direction to manufacture an electrode assembly. The electrode assembly was housed in a case, and an electrolyte was injected thereinto to manufacture a rechargeable battery cell.

The electrolyte included 1.0 M $LiPF_6$ dissolved in a mixed solvent (a volume ratio of 50:50) of ethylene carbonate (EC) and diethyl carbonate (DEC).

Comparative Example 2

(1) Manufacture of Unit Cell

A unit cell was manufactured according to the same method as Example 1.

(2) Manufacture of Outer Unit Cell

Positive active material slurry was prepared by mixing 94 wt % of a positive active material having a composition of $LiNi_{0.6}Co_{0.2}Mn_{0.2}O_2$ and a reference potential of 3.67 V, 3 wt % of a polyvinylidene fluoride binder, and 3 wt % of a ketjen black conductive material in an N-methylpyrrolidone solvent.

94 wt % of a first active material having a composition of $LiCoO_2$ and a reference potential of 3.85 V, 3 wt % of a polyvinylidene fluoride binder, and 3 wt % of a ketjen black conductive material were mixed in an N-methylpyrrolidone solvent to prepare a composition for a first functional layer.

The positive active material slurry was coated on both (opposite) surfaces of an aluminum current collector and then dried and compressed to form a positive active material layer, and on the positive active material layer, the composition for a first functional layer was coated and then dried and compressed to form a first functional layer. Accordingly, a positive electrode having the first functional layer on the positive active material layer was manufactured.

A negative electrode was manufactured according to the same method as the above (1).

The negative electrode, a separator formed of a polyethylene and polypropylene multi-layered substrate, and the positive electrode manufactured in the above (2) were sequentially stacked to manufacture an outer unit cell.

(3) Manufacture of Rechargeable Battery Cell

The thirteen (13) unit cells manufactured in the (1) were overlapped in a thickness direction of the unit cells to manufacture a stack of the unit cells. The outer unit cells manufactured in the (2) were respectively laminated on the outermost first and second surfaces of the stack to manufacture an electrode assembly having a structure shown in FIG. 1A, the electrode assembly was housed in a case, and an electrolyte was injected thereinto to manufacture a rechargeable battery cell.

The electrolyte included 1.0 M $LiPF_6$ dissolved in a mixed solvent (a volume ratio of 50:50) of ethylene carbonate (EC) and diethyl carbonate (DEC).

Experimental Example 1: Measurement of Charge and Discharge Characteristics and Cycle-Life Characteristics The rechargeable battery cells according to Examples 1 to 3 and Comparative Examples 1 to 2 were respectively charged at a constant current and constant voltage of 0.1 C and 4.3 V and with a cut-off at 0.05 C, paused for 10 minutes, discharged at a constant current of 0.1 C with a cut-off at 2.7 V, and paused for 10 minutes, which is regarded as one cycle, and after performing one charge and discharge cycle, charge and discharge capacities of the rechargeable battery cells were measured. The measurements are shown in Table 1.

Subsequently, the charge and discharge were performed 500 times under the same conditions as above, and discharge capacities of the rechargeable battery cells were measured. A capacity retention of discharge capacity at the $500^{th}$ cycle relative to discharge capacity at the $1^{st}$ cycle was calculated, and the results are shown in Table 1.

TABLE 1

|  | Charge capacity | Discharge capacity | Capacity retention (%) |
| --- | --- | --- | --- |
| Example 1 | 5058 mAh | 4403 mAh | 87 |
| Example 2 | 5073 mAh | 4412 mAh | 86 |
| Example 3 | 5053 mAh | 4398 mAh | 86 |
| Comparative Example 1 | 5062 mAh | 4405 mAh | 83 |
| Comparative Example 2 | 5012 mAh | 4380 mAh | 76 |

As shown in Table 1, the rechargeable battery cells having a functional layer including an active material having a lower reference potential than that of an active material included in an active material layer according to Examples 1 to 3 showed an improved (excellent) capacity retention compared with the rechargeable battery cells having no functional layer or a functional layer including an active material having a higher reference potential than that of an active material included in an active material layer according to Comparative Examples 1 and 2.

Experimental Example 2: Measurement of Safety

Each of the ten (10) rechargeable battery cells according to Examples 1 to 3 and Comparative Examples 1 to 2 were manufactured and experimented on regarding penetration.

The penetration experiment was performed by charging the rechargeable lithium battery cells at 0.5 C and 4.3 V with a cut-off at 0.05 C, and, after about one hour, a pin having a diameter of 3 mm was used to completely penetrate a center of the cells at 80 mm/sec. The results are shown in Table 2. In Table 2, numbers indicate the number of cells having non-ignition, smoke generation, and ignition.

TABLE 2

|  | Non-ignition | Smoke generation | Ignition |
| --- | --- | --- | --- |
| Example 1 | 7 | 3 | 0 |
| Example 2 | 8 | 2 | 0 |
| Example 3 | 5 | 2 | 3 |
| Comparative Example 1 | 0 | 0 | 10 |
| Comparative Example 2 | 0 | 0 | 10 |

As shown in Table 2, the cells having a functional layer including an active material having a lower reference potential than that of an active material included in an active material layer according to Examples 1 to 3 showed excellent safety compared with the cells having no functional layer or a functional layer including an active material having a higher reference potential than that of an active material included in an active material layer according to Comparative Examples 1 and 2.

It will be understood that, although the terms "first," "second," "third," etc., may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the spirit and scope of the inventive concept.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations), and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the inventive concept." Also, the term "exemplary" is intended to refer to an example or illustration.

It will be understood that when an element or layer is referred to as being "on," "connected to," "coupled to," or "adjacent to" another element or layer, it can be directly on, connected to, coupled to, or adjacent to the other element or layer, or one or more intervening elements or layers may be present. In contrast, when an element or layer is referred to as being "directly on," "directly connected to," "directly coupled to," or "immediately adjacent to" another element or layer, there are no intervening elements or layers present.

As used herein, the terms "substantially," "about," and similar terms are used as terms of approximation and not as terms of degree, and are intended to account for the inherent deviations in measured or calculated values that would be recognized by those of ordinary skill in the art.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

As used herein, the terms "use," "using," and "used" may be considered synonymous with the terms "utilize," "utilizing," and "utilized," respectively.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims, and equivalents thereof.

DESCRIPTION OF SYMBOLS

200, 201, 202, 210: electrode assembly
10: unit cell

110: first functional unit cell
120: second functional unit cell
130: third functional unit cell

What is claimed is:

1. An electrode assembly, comprising:
a plurality of unit cells overlapping in a thickness direction of the plurality of unit cells, wherein each cell unit comprises a negative electrode, a positive electrode and a separator between the negative and positive electrodes;
a first functional unit cell at an outermost first surface of the plurality of unit cells; and
a second functional unit cell at an outermost second surface of the plurality of unit cells that is opposite to the first surface,
wherein:
each of the first functional unit cell and the second functional unit cell comprises:
an outer unit cell comprising the negative electrode, an outer positive electrode, and the separator between the negative electrode and the outer positive electrode; and
the outer positive electrode comprises:
a positive current collector,
a positive active material layer on at least one surface of the positive current collector and comprising a positive active material having a first reference potential, and
a first functional layer on the positive active material layer and comprising a first active material having a second reference potential lower than the first reference potential; and
wherein the plurality of cell units do not comprise the first active material.

2. The electrode assembly of claim 1, wherein the first reference potential is in a range of about 3.3 V to about 4.3 V.

3. The electrode assembly of claim 1, wherein the second reference potential is in a range of about 1.5 V to about 3.8 V.

4. The electrode assembly of claim 1, wherein a difference between the first reference potential and the second reference potential is in a range of about 0.01 V to about 2.0 V.

5. The electrode assembly of claim 1, further comprising a third functional unit cell at the center in the thickness direction of the plurality of unit cells,
wherein:
the third functional unit cell comprises:
a central unit cell comprising a negative electrode, a positive electrode, and a separator between the negative electrode and the positive electrode; and
the positive electrode comprises:
a positive current collector,
a positive active material layer on at least one surface of the positive current collector and comprising a positive active material having the first reference potential, and
a second functional layer on the positive active material layer and comprising a second active material having a third reference potential lower than the first reference potential.

6. The electrode assembly of claim 5, wherein the third reference potential is in a range of about 1.5 V to about 3.8 V.

7. The electrode assembly of claim 5, wherein a difference between the first reference potential and the third reference potential is in a range of about 0.01 V to about 2.0 V.

8. An electrode assembly, comprising:
a plurality of unit cells overlapping in a thickness direction of the plurality of unit cells, wherein each cell unit comprises a negative electrode, a positive electrode and a separator between the negative and positive electrodes, and
a third functional unit cell at the center in the thickness direction of the plurality of unit cells,
wherein:
the third functional unit cell comprises:
a central unit cell comprising the negative electrode, a center positive electrode, and the separator between the negative electrode and the positive electrode; and
the center positive electrode comprises:
a positive current collector,
a positive active material layer on at least one surface of the positive current collector and comprising a positive active material having a first reference potential, and
a second functional layer on the positive active material layer and comprising a second active material having a third reference potential lower than the first reference potential; and
wherein the plurality of cell units do not comprise the second active material.

9. The electrode assembly of claim 8, wherein the first reference potential is in a range of about 3.3 V to about 4.3 V.

10. The electrode assembly of claim 8, wherein the third reference potential is in a range of about 1.5 V to about 3.8 V.

11. The electrode assembly of claim 8, wherein a difference between the first reference potential and the third reference potential is in a range of about 0.01 V to about 2.0 V.

12. A rechargeable battery comprising the electrode assembly of claim 1.

13. The rechargeable battery of claim 12, wherein the rechargeable battery is a stack-type rechargeable battery, a winding-type rechargeable battery, or a jelly-roll-type rechargeable battery.

14. A rechargeable battery comprising the electrode assembly of claim 8.

15. The rechargeable battery of claim 14, wherein the rechargeable battery is a stack-type rechargeable battery, a winding-type rechargeable battery, or a jelly-roll-type rechargeable battery.

16. A method of manufacturing an electrode assembly, the method comprising:
overlapping a plurality of unit cells in a thickness direction of the plurality of unit cells, wherein each cell unit comprises a negative electrode, a positive electrode and a separator between the negative and positive electrodes; and
forming a functional unit cell at an outermost surface or at the center in the thickness direction of the plurality of unit cells, the functional unit cell being formed to comprise a positive electrode, the positive electrode comprising a positive current collector, a positive active material layer on at least one surface of the positive current collector and comprising a positive active material having a first reference potential, and a functional layer on the positive active material layer and comprising an active material having a reference potential lower than the first reference potential; and
wherein the plurality of cell units do not comprise the active material.

17. The method of claim 16, wherein the forming of the functional unit cell comprises:
- forming a first functional unit cell at an outermost first surface of the plurality of unit cells; and
- forming a second functional unit cell at an outermost second surface of the plurality of unit cells that is opposite to the first surface, wherein:
each of the first functional unit cell and the second functional unit cell comprises:
- an outer unit cell comprising a negative electrode, a positive electrode, and a separator between the negative electrode and the positive electrode; and the positive electrode comprises:
- a positive current collector,
- a positive active material layer on at least one surface of the positive current collector and comprising the positive active material having the first reference potential, and
- a first functional layer on the positive active material layer and comprising a first active material having a second reference potential lower than the first reference potential.

18. The method of claim 17, wherein the forming of the functional unit cell comprises:
forming a third functional unit cell at the center in the thickness direction of the plurality of unit cells,
wherein:
the third functional unit cell comprises:
- a central unit cell comprising a negative electrode, a positive electrode, and a separator between the negative electrode and the positive electrode; and the positive electrode comprises:
- a positive current collector,
- a positive active material layer on at least one surface of the positive current collector and comprising a positive active material having the first reference potential, and
- a second functional layer on the positive active material layer and comprising a second active material having a third reference potential lower than the first reference potential.

19. The method of claim 16, wherein the forming of the functional unit cell comprises:
forming a third functional unit cell at the center in the thickness direction of the plurality of unit cells,
wherein:
the third functional unit cell comprises:
- a central unit cell comprising a negative electrode, a positive electrode, and a separator between the negative electrode and the positive electrode; and the positive electrode comprises:
- a positive current collector,
- a positive active material layer on at least one surface of the positive current collector and comprising a positive active material having the first reference potential, and
- a second functional layer on the positive active material layer and comprising a second active material having a third reference potential lower than the first reference potential.

20. A method of manufacturing a rechargeable battery, the method comprising manufacturing an electrode assembly according to claim 16.

* * * * *